(12) United States Patent
Owens et al.

(10) Patent No.: US 11,016,063 B2
(45) Date of Patent: *May 25, 2021

(54) SYSTEMS, METHODS, AND MEDIA FOR DETECTING ABNORMALITIES IN EQUIPMENT THAT EMIT ULTRASONIC ENERGY INTO A SOLID MEDIUM DURING FAILURE

(71) Applicant: Latency, LLC, Hingham, MA (US)

(72) Inventors: Peter Owens, Hingham, MA (US); David Micallef, Rabat (MT)

(73) Assignee: Latency, LLC, Hingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/799,386

(22) Filed: Feb. 24, 2020

(65) Prior Publication Data

US 2020/0191753 A1   Jun. 18, 2020

Related U.S. Application Data

(63) Continuation of application No. 15/884,157, filed on Jan. 30, 2018, now Pat. No. 10,620,170.
(Continued)

(51) Int. Cl.
*G01N 29/04* (2006.01)
*G01N 29/28* (2006.01)
(Continued)

(52) U.S. Cl.
CPC .......... *G01N 29/46* (2013.01); *G01N 29/041* (2013.01); *G01N 29/14* (2013.01);
(Continued)

(58) Field of Classification Search
CPC ........ G01N 29/46; G01N 29/14; G01N 29/28; G01N 29/041; G01N 29/2481; G01N 2291/023; H04R 17/02
(Continued)

(56) References Cited

U.S. PATENT DOCUMENTS 4,679,947 A   7/1987   Miller et al.
4,898,022 A   2/1990   Yumoto et al.
(Continued)

FOREIGN PATENT DOCUMENTS

EP   1705468   9/2006
JP   2013140576   7/2013
(Continued)

OTHER PUBLICATIONS

International Preliminary Report on Patentability dated Jul. 30, 2019 in International Patent Application No. PCT/US2018/016013.
(Continued)

*Primary Examiner* — Jacques M Saint Surin
(74) *Attorney, Agent, or Firm* — Byrne Poh LLP

(57) ABSTRACT

Systems, methods, and media for detecting abnormalities in equipment that emit ultrasonic energy into a solid medium during failure are provided. In some embodiments, devices for monitoring a piece of equipment are provided, the devices comprising: a piezo microphone having a signal output; a mechanical structure acoustically coupling the piezo microphone to the piece of equipment; a hardware processor configured to: receive intensity signals based on the signal output of the piezo microphone; perform a fast Fourier transform on the received intensity signals to produce a set of output band values for each of a plurality of frequency bands; average at least some of the output band values to produce an average value; and calculate a sum of at least some of the output band values; and a transceiver that transmits the sum to a remote device.

17 Claims, 13 Drawing Sheets

Related U.S. Application Data

(60) Provisional application No. 62/483,756, filed on Apr. 10, 2017, provisional application No. 62/452,034, filed on Jan. 30, 2017.

(51) Int. Cl.
*G01N 29/24* (2006.01)
*G01N 29/14* (2006.01)
*G01N 29/46* (2006.01)
*H04R 17/02* (2006.01)

(52) U.S. Cl.
CPC .......... *G01N 29/2481* (2013.01); *G01N 29/28* (2013.01); *G01N 2291/023* (2013.01); *H04R 17/02* (2013.01)

(58) Field of Classification Search
USPC .......................................................... 73/592
See application file for complete search history.

(56) References Cited

U.S. PATENT DOCUMENTS

| | | | |
|---|---|---|---|
| 5,154,080 A | 10/1992 | Hill et al. | |
| 5,257,545 A | 11/1993 | Au-Yang | |
| 5,533,383 A | 7/1996 | Greene et al. | |
| 5,587,534 A | 12/1996 | McColskey et al. | |
| 5,650,943 A | 7/1997 | Powell et al. | |
| 5,798,459 A | 8/1998 | Ohba et al. | |
| 6,189,384 B1 | 2/2001 | Piety et al. | |
| 6,220,098 B1 | 4/2001 | Johnson et al. | |
| 6,247,353 B1 | 6/2001 | Battenberg et al. | |
| 6,332,112 B1 | 12/2001 | Shukunami et al. | |
| 6,412,352 B1 | 7/2002 | Evans et al. | |
| 6,571,180 B1 | 5/2003 | Turner et al. | |
| 6,581,466 B1 | 6/2003 | Costley et al. | |
| 6,923,063 B2 | 8/2005 | Komninos | |
| 6,988,411 B2 | 1/2006 | Gysling et al. | |
| 7,197,938 B2 | 4/2007 | Gysling et al. | |
| 7,249,525 B1 | 7/2007 | Engel | |
| 7,261,002 B1 | 8/2007 | Gysling et al. | |
| 7,290,450 B2 | 11/2007 | Brown et al. | |
| 7,664,610 B2 | 2/2010 | Anderson et al. | |
| 7,672,794 B2 | 3/2010 | Gysling et al. | |
| 8,050,875 B2 | 11/2011 | Kraschnia et al. | |
| 8,245,576 B2 | 8/2012 | Komninos | |
| 8,632,244 B2 | 1/2014 | Bar-Cohen et al. | |
| 8,707,785 B2 | 4/2014 | Goodman et al. | |
| 9,157,829 B2 | 10/2015 | Spasova | |
| 9,310,412 B2 | 4/2016 | Arunachalam et al. | |
| 9,442,094 B2 | 9/2016 | Sinha et al. | |
| 10,620,170 B2 * | 4/2020 | Owens | G01N 29/041 |
| 2002/0139191 A1 | 10/2002 | Hedeen et al. | |
| 2004/0024544 A1 | 2/2004 | Guebert et al. | |
| 2005/0011278 A1 | 1/2005 | Brown et al. | |
| 2005/0050956 A1 | 3/2005 | Gysling et al. | |
| 2005/0087016 A1 | 4/2005 | Gilmore et al. | |
| 2005/0155429 A1 | 7/2005 | Griessler et al. | |
| 2006/0042387 A1 | 3/2006 | Komninos | |
| 2006/0118648 A1 | 6/2006 | Armstrong et al. | |
| 2007/0028693 A1 | 2/2007 | Komninos | |
| 2010/0153068 A1 | 6/2010 | Armstrong et al. | |
| 2011/0316707 A1 | 12/2011 | Gains et al. | |
| 2013/0103326 A1 | 4/2013 | Von Drasek et al. | |
| 2013/0167783 A1 | 7/2013 | Poczka et al. | |
| 2013/0173178 A1 | 7/2013 | Poczka et al. | |
| 2013/0305827 A1 | 11/2013 | Kessler et al. | |
| 2014/0090712 A1 | 4/2014 | Karschnia et al. | |
| 2014/0311245 A1 | 10/2014 | Horoshenkov et al. | |
| 2016/0098021 A1 | 4/2016 | Zornio et al. | |
| 2016/0098037 A1 | 4/2016 | Zornio et al. | |
| 2016/0116392 A1 * | 4/2016 | Carpenter | B01D 35/143 702/34 |
| 2016/0377500 A1 | 12/2016 | Bizub | |
| 2017/0370606 A1 | 12/2017 | Conner et al. | |
| 2018/0128424 A1 | 5/2018 | Fujiwara et al. | |

FOREIGN PATENT DOCUMENTS

| | | |
|---|---|---|
| JP | 2013156161 | 8/2013 |
| WO | WO 2006061397 | 6/2006 |
| WO | WO 2013108086 | 7/2013 |
| WO | WO 2014052141 | 4/2014 |
| WO | WO 2018019887 | 2/2018 |

OTHER PUBLICATIONS

International Search Report and Written Opinion dated Apr. 5, 2018 in International Patent Application No. PCT/US2018/016013.
Notice of Allowance dated Jan. 21, 2020 in U.S. Appl. No. 15/884,157.
Office Action dated Aug. 14, 2019 in U.S. Appl. No. 15/884,157.
Extended European Search Report dated Jul. 24, 2020 in EP Patent Application No. 18743941.9, pp. 1-10.
International Search Report and Written Opinion dated May 18, 2020 in International Patent Application No. PCT/US2020/019095, pp. 1-14.
Office Action dated Apr. 2, 2020 in Canadian Patent Application No. 3,074,672, pp. 1-4.

* cited by examiner

SECTION A-A
SCALE 1 / 2

SYSTEMS, METHODS, AND MEDIA FOR DETECTING ABNORMALITIES IN EQUIPMENT THAT EMIT ULTRASONIC ENERGY INTO A SOLID MEDIUM DURING FAILURE

CROSS REFERENCE TO RELATED APPLICATIONS

This application is a continuation of U.S. patent application Ser. No. 15/884,157, filed Jan. 30, 2018, which claims the benefit of U.S. Provisional Patent Application No. 62/452,034, filed Jan. 30, 2017 and U.S. Provisional Patent Application No. 62/483,756, filed Apr. 10, 2017, each of which is hereby incorporated by reference herein in its entirety.

BACKGROUND

Monitoring mechanical devices for signs of failure is an essential part of equipment maintenance. This is especially true in industry where machines can be operated for very long durations and any failure of the equipment can be very costly.

For example, steam traps are an essential part of steam systems. A steam trap removes condensate (condensed steam) and non-condensable gases from the steam heat system without allowing steam to escape. Unfortunately, when steam traps fail, steam can escape resulting in wasted energy.

Likewise, bearings are an essential part of machines containing rotating components. The bearings make it easy for the parts to rotate. Unfortunately, when bearings fail, rotating parts in machines can stop turning, causing the equipment to stop operating.

Accordingly, it is desirable to provide new mechanisms for detecting abnormalities in equipment.

SUMMARY

Systems, methods, and media for detecting abnormalities in equipment that emit ultrasonic energy into a solid medium during failure are provided. In some embodiments, devices for monitoring a piece of equipment are provided, the devices comprising: a piezo microphone having a signal output; a mechanical structure acoustically coupling the piezo microphone to the piece of equipment; a hardware processor configured to: receive intensity signals based on the signal output of the piezo microphone; perform a fast Fourier transform on the received intensity signals to produce a set of output band values for each of a plurality of frequency bands; average at least some of the output band values to produce an average value; and calculate a sum of at least some of the output band values; and a transceiver that transmits the sum to a remote device.

DETAILED DESCRIPTION

Systems, methods, and media for detecting abnormalities in equipment that emit ultrasonic energy into a solid medium during failure are provided.

Figure 1:
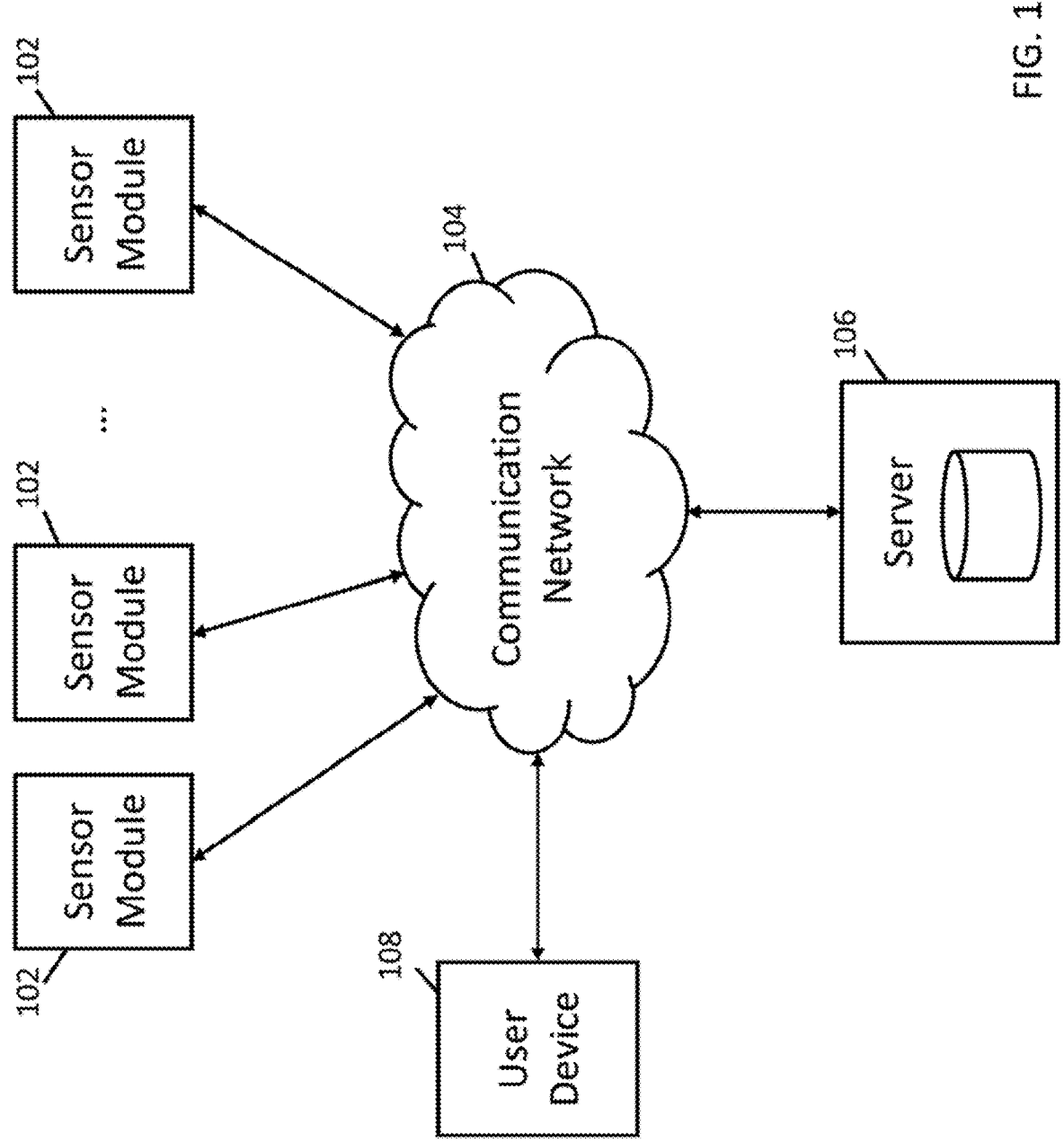
FIG. 1 is a block diagram of an example of a system for detecting abnormalities in equipment that emit ultrasonic energy into a solid medium during failure in accordance with some embodiments.

Turning to FIG. 1, an example 100 of a system for detecting abnormalities in equipment that emit ultrasonic energy into a solid medium during failure is illustrated. As shown, system 100 includes one or more sensor modules 102, a communication network 104, a server 106, and a user device 108.

Sensor modules 102 can be any suitable sensor modules, and any suitable number of sensor modules can be used. For example, in some embodiments, sensor modules 102 can be the sensor modules described below in connection with FIG. 2.

Communication network 104 can be any suitable communication network and/or combination of communication networks. For example, communication network 104 can be wired and/or wireless, and can include the Internet, telephone networks, cable television networks, mobile phone networks, satellite networks, radio networks, mesh networks, low-power wide-area networks (LPWANs), and/or any other suitable mechanisms for communicating information. More particularly, for example, communication network 104 can include the Senet Network from Senet, Inc. of Portsmouth, N.H. As another example, communication network 104 can include the MachineQ network available from Comcast of Philadelphia, Pa.

Server 106 can be any suitable device for receiving data from sensor modules 102, controlling sensor modules 102, storing the data, processing the data, providing information to a user via user device 108, and/or performing any other suitable functions. Any suitable number of servers can be used, and the functions described here as being performed by the server can be performed across two or more servers, in some embodiments. In some embodiments, server 106 can be a general-purpose computer or a special purpose computer. In some embodiments, server 106 can include, or be connected to, a database.

User device 108 can be any suitable device for accessing server 106 in order to review information from server 106, control settings for the sensor modules, and/or perform any other suitable functions and any suitable number of user devices can be used. In some embodiments, user device 108 can be a general-purpose computer or a special purpose computer, such as a smartphone.

Figure 2:
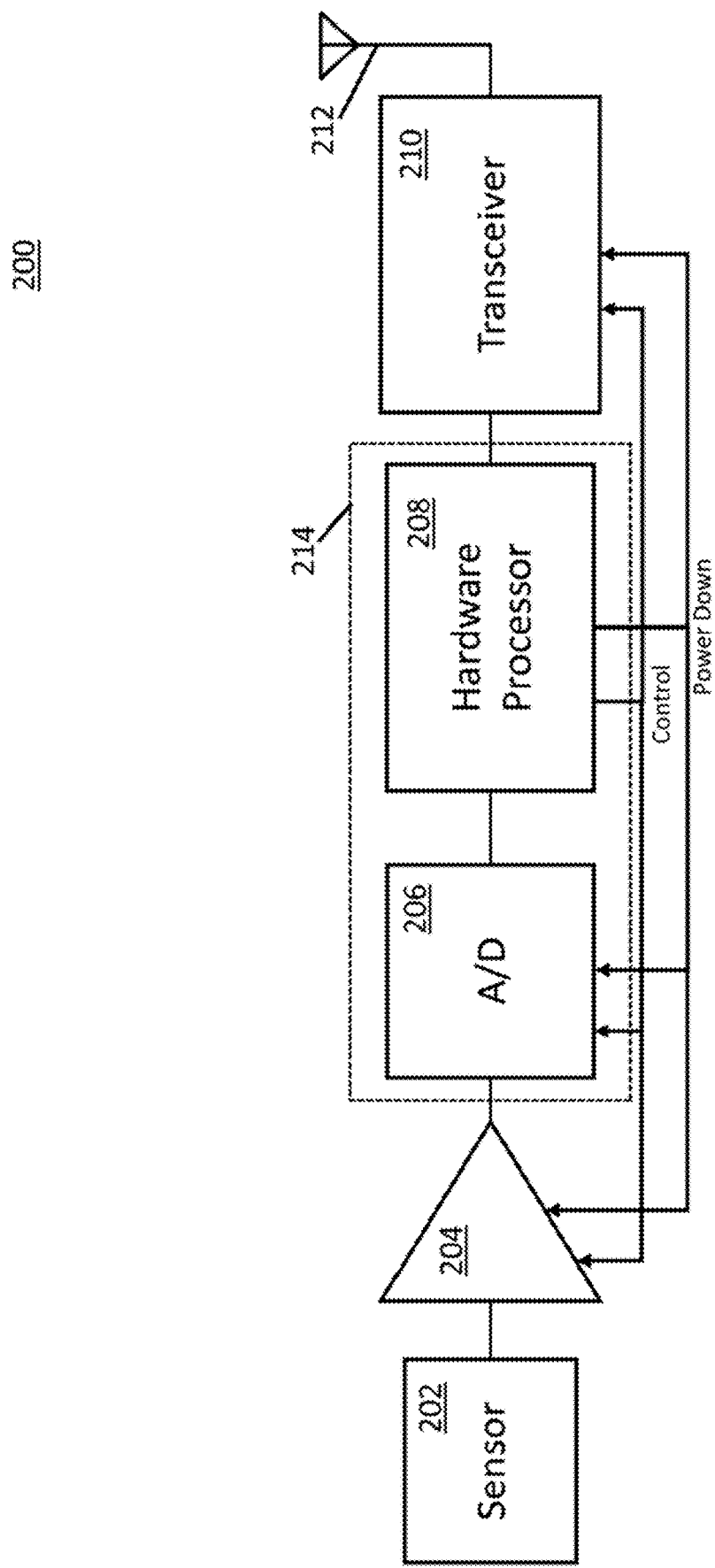
FIG. 2 is a block diagram of an example of a sensor module for detecting abnormalities in equipment that emit ultrasonic energy into a solid medium during failure in accordance with some embodiments.

Turning to FIG. 2, an example 200 of a sensor module that can be used in accordance with some embodiments is illustrated. As shown, sensor module 200 can include a sensor 202, an amplifier 204, an analog-to-digital converter 206, a hardware processor 208, a transceiver 210, and an antenna 212. In some embodiments, analog-to-digital converter 206 and hardware processor 208 can be combined into a single device 214.

Sensor 202 can be any suitable sensor or transducer for detecting ultrasonic energy in a solid medium during failure. For example, in some embodiments, sensor 202 can be a Piezo speaker configured to act as a microphone. More particularly, the sensor can be Piezoelectric diaphragm model number 7BB-27-4L0 from Murata Manufacturing Co., Ltd. of Tokyo, Japan.

Figure 8:
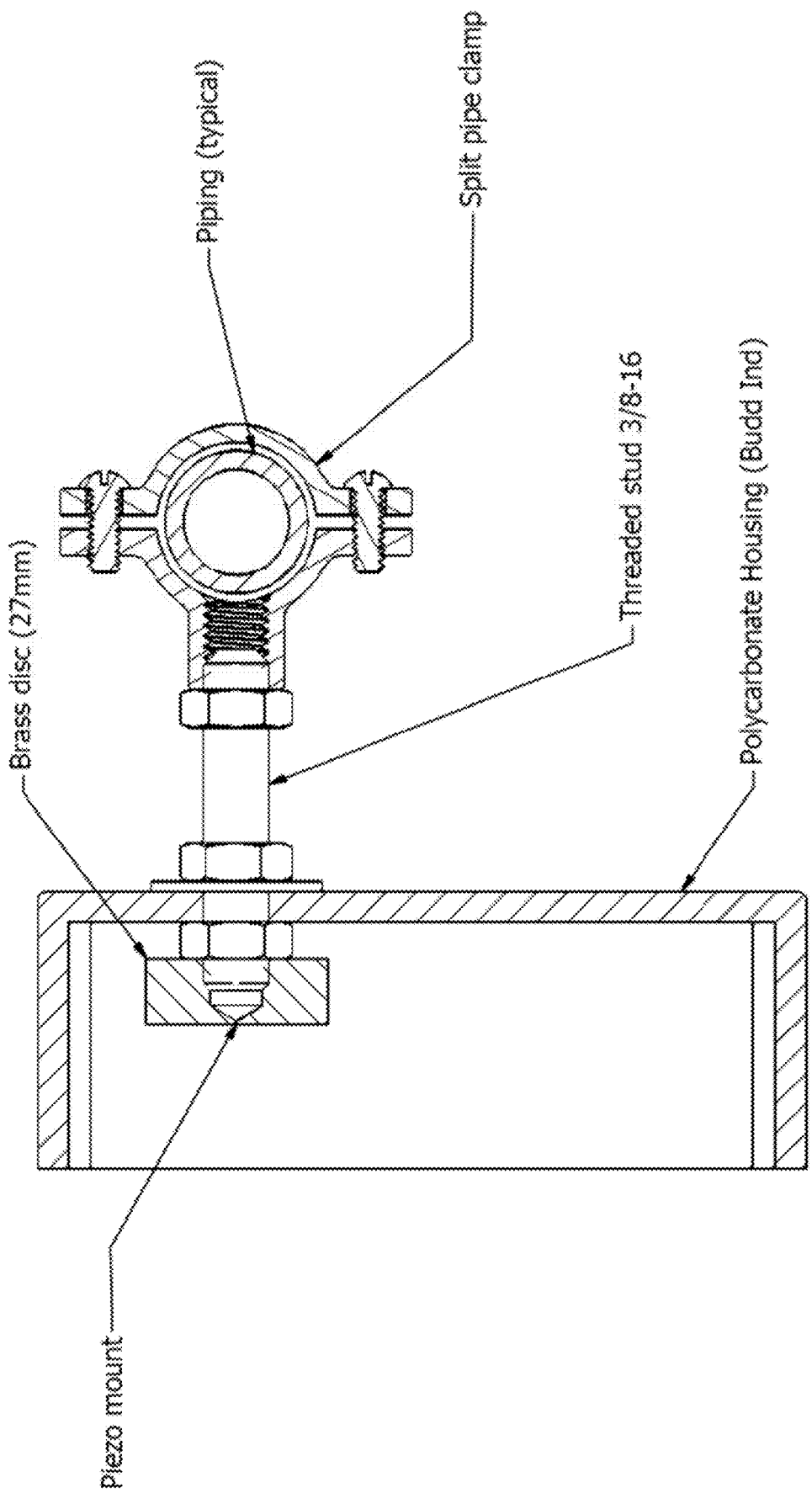
FIG. 8 is an illustration of an example of a mechanism for coupling a sensor to a pipe in accordance with some embodiments.

As shown in FIG. 8, in some embodiments, sensor 202 can be acoustically coupled (which includes any coupling capable of passing signals that can be detected by sensor 202) to a a piece of equipment (i.e., for purposes of illustration, a steam trap) by way of a brass disc (to which the sensor can be glued), a stud (on which the brass disc is threaded), a split pipe clamp (into which the stud is screwed), and a pipe at the output of the steam trap (to which the split pipe clamp is clamped). In some embodiments, sensor 202 can be coupled to acoustically coupled to a piece of equipment (e.g., a steam trap) in any other suitable manner.

Amplifier 204 can be any suitable amplifier that can be configured to amplify the signals generated by sensor 202. For example, amplifier 204 can be a variable gain amplifier having any suitable range(s) of gain and any suitable mechanisms for automatically adjusting the gain (Automatic Gain Control). More particularly, for example, amplifier 204 can be configured to have a gain between 40 dB and 60 dB. In some embodiments, for example, amplifier 204 can be implemented using microphone amplifier model number MAX9814ETD+T available from Maxim Integrated of San Jose, Calif.

Analog-to-digital converter 206 can be any suitable analog-to-digital converter for converting the analog signals output by amplifier 204 into digital format usable by the hardware processor.

Hardware processor 208 can be any suitable processor for controlling the functions of sensor module 200 as described herein. For example, in some embodiments, hardware processor 208 can be a microprocessor, a microcontroller, a digital signal processor, and/or any other suitable device for performing the functions described herein. In some embodiments, hardware processor 208 can include any suitable form of memory and/or storage for storing programs and/or data. In some embodiments, although not shown in FIG. 2, memory and/or storage can be provided in the sensor module that is separate from the hardware processor.

As mentioned above, analog-to-digital converter 206 and hardware processor 208 can be implemented, in some embodiments, as one device 214. For example, in some embodiments, device 214 can be implemented using model STM32F051R8T6TR available from STMicroelectronics of Geneva, Switzerland.

Transceiver 210 can be any suitable transceiver for communicating data to and/or from sensor module 200, and may utilize wireless or wire-based communication technologies. For example, in some embodiments, transceiver 210 may be implemented using a model RN2903 Module from Microchip Technology Inc. of Chandler, Ariz.

In some embodiments, transceiver 210 may be implemented as only a transmitter. In some embodiments, transceiver 210 may be implemented as a separate transmitter and a separate receiver.

Antenna 212 can be any suitable antenna implemented in any suitable manner.

Although not shown in FIG. 2, in some embodiments, sensor module 200 can include one or more additional or alternative sensors, such as location, light, heat, humidity, pressure, occupancy, and/or noise sensors, in some embodiments. Additional amplifiers and analog-to-digital converters can be provided for each of these sensors, or an analog multiplexer can be provided between the sensors and the amplifier, to facilitate these sensors being sampled by the hardware processor.

Also, although not shown in FIG. 2, a battery and/or power supply may be included to power the components shown.

Generally speaking, in some embodiments, during operation, hardware processor 208 can be configured to control the operation of amplifier 204, analog-to-digital converter 206, and transceiver 210 via one or more control signals. In some embodiments, thus, under the control of the hardware processor, the amplifier can amplify signals from the sensor, the analog-to-digital converter can sample and digitize the amplified signals, the hardware processor can process the digitized signals and provide resulting data to the transceiver, and the transceiver can transmit the data via communication network 104 (FIG. 1) to server 106 (FIG. 1). In some embodiments, the transceiver can also receive via the communication network from the server control signals and provide those signals to the hardware processor. The control signals can be used in some embodiments to control the configuration and programming of the hardware processor, and the configuration settings of the amplifier, the analog-to-digital converter, and the transceiver, and thereby alter the operation of the sensor module.

Figure 3:
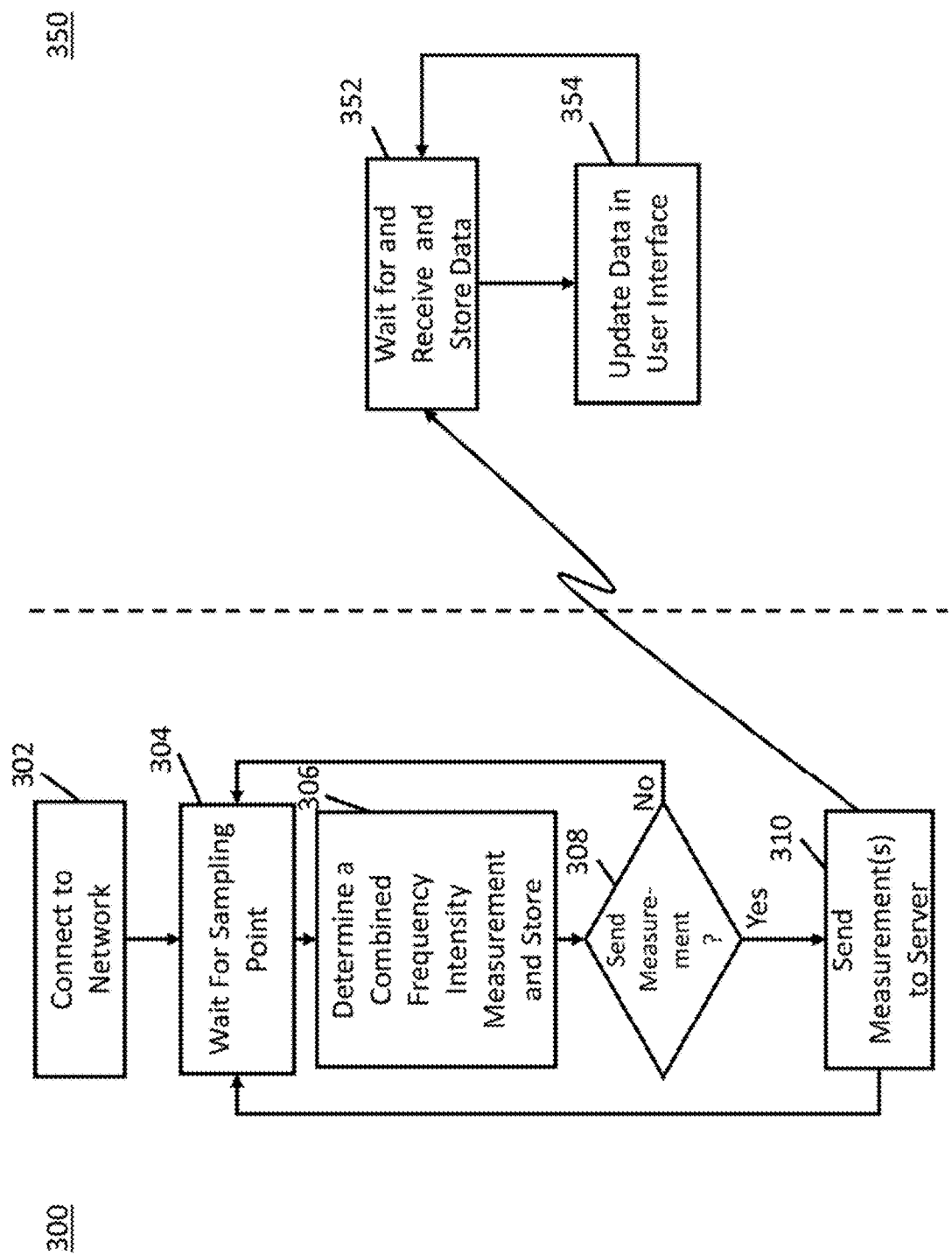
FIG. 3 is a flow diagram of an example of a process for detecting abnormalities in equipment that emit ultrasonic energy into a solid medium during failure in accordance with some embodiments.

Turning to FIG. 3, examples 300 and 350 of process that can run in sensor module 102 and server 106, respectively, to transfer equipment monitoring data from the sensor module to the server in accordance with some embodiments are shown.

As illustrated, in process 300, at 302 the process can begin by connecting to communication network 104 (FIG. 1). This can be performed in any suitable manner.

At 304, process can then wait for a sampling point for sampling the signals detected by sensor 202 (FIG. 2). Any suitable sampling points can be used in some embodiments. For example, sampling points can occur every minute in some embodiments. In some embodiments, sampling points need not be periodic.

Next, at 306, the process can determine a combined frequency intensity measurement for the sensor module.

This measurement can be determined in any suitable manner. For example, in some embodiments, this measurement can be determined using the process described below in connection with FIG. 4.

Then, at 308, the process can determine whether stored combined frequency intensity measurement(s) is (are) to be sent to the server. This determination can be made on any suitable basis. For example, this determination can be made based on the passage of a period of time (e.g., 30 minutes) since the last sending of measurement(s) in some embodiments. As other examples, this determination can be based on available power in a battery or based on available memory in storage of the hardware processor.

If it is determined at 308 to send the measurement(s), then, at 310, process 300 can send the measurement(s) from the sensor module to the server. This can occur in any suitable manner. For example, this can occur by hardware processor 208 (FIG. 2) providing the data to transceiver 210 (FIG. 2) and instructing transceiver 210 (FIG. 2) to transmit the data via communication network 104 (FIG. 1) to server 106 (FIG. 1).

If it is determined at 308 to not send the data, or after sending the data at 310, process 300 can then loop back to 304.

At 352, process 350 can receive at the server the data sent at 308 from the sensor module.

Then at 354, process 350 can update the data in the user interface, as described below, and loop back to 352.

Figure 4:
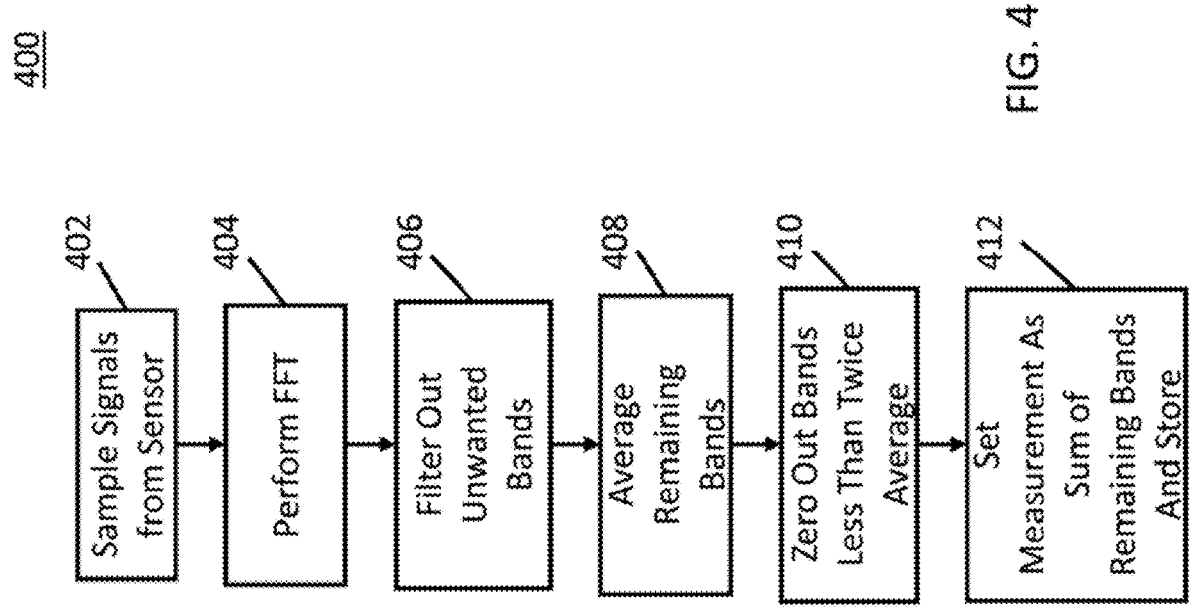
FIG. 4 is a flow diagram of an example of a process for determining a combined frequency intensity measurement in accordance with some embodiments.

Turning to FIG. 4, an example 400 of a process for determining a combined frequency intensity measurement in accordance with some embodiments is shown. As illustrated, process 400 begins by sampling the signals from sensor 202 (FIG. 2) at 402. Sampling the signals from sensor 202 can be performed in any suitable manner. For example, in some embodiments, sampling the signals can be performed by enabling amplifier 204 (FIG. 2) and analog-to-digital converter 206 (FIG. 2), and taking samples of the signal output from the amplifier at a sampling frequency of 253 kHz for a duration of 1013 microseconds.

Next, at 404, process 400 can perform a Fast Fourier Transform (FFT) on the sampled data. Any suitable parameters for the FFT can be used in some embodiments. For example, in some embodiments, when using a sampling frequency of 253 kHz, an FFT with a size of 256 can be provided with 128 bins (size/2) with a spectral line of 0.988 kHz (253 kHz/256 kHz).

Then, at 406, process 400 can filter out unwanted bands. For Example, in some embodiments, process 400 can ignore data in the FFT output bins for 0-19 kHz and 51-100 kHz.

At 408, the process can average the values of the FFT output bins in the wanted bins. For example, process 400 can average the values of the FFT output bins for 20 kHz to 50 kHz.

Next, at 410, process 400 can zero-out the FFT output bins for all of the wanted bins having values which are lower than twice the average.

Finally, at 412, process 400 can set as the combined frequency intensity measurement value the sum of the values of the wanted bins.

Although specific examples of values (e.g., for frequencies, durations, bin sizes, etc.) are provided in connection with FIG. 4, it should be apparent that these values can be changed in some embodiments.

In some embodiments, to save power, components of the sensor module can be turned off or put into a low power mode when not performing any functions. For example, at 304 (FIG. 3), while waiting for a sampling point, amplifier 204 (FIG. 2), analog-to-digital converter 206 (FIG. 2) and transceiver 210 (FIG. 2) can be powered-down, and hardware processor 208 (FIG. 2) can be put in a low power state in which only a timer is being monitored for when the processor is to wake up and branch to 306 of process 300. At 306, amplifier 204 (FIG. 2), analog-to-digital converter 206 (FIG. 2), and hardware processor 208 (FIG. 2) can be turned-on and transceiver 210 (FIG. 2) can remain powered-down. And, at 310, amplifier 204 (FIG. 2) and analog-to-digital converter 206 (FIG. 2) can be powered-down, hardware processor 208 (FIG. 2) can remain turned-on, and transceiver 210 (FIG. 2) can be turned-on.

In some embodiments, server 106 can send parameters, commands, executable code, and/or any other programs or data to sensor module 102. For example, in some embodiments, the server can send parameters specifying the sampling points (which can be specified as specific points in time, as a time interval, and/or in any other suitable manner) (at 304 of FIG. 3), the amplifier gain, the analog-to-digital converter sampling frequency and/or duration (at 402 of FIG. 4), bands to be filtered (at 406 of FIG. 4) (e.g., in some embodiments, in may be desirable to filter out one or more bins of the FFT output due to noise present in those bins), the bands to be zeroed-out (at 410 of FIG. 4 (e.g., other than less than twice the average)), and/or when to send data (at 310 of FIG. 3).

In some embodiments, when monitoring a steam trap, for example, a sensor module can determine the frequency at which the steam trap to which it is connected is cycling. The frequency of cycling of the steam trap can be an indicator of the amount of condensate that the steam trap is processing. This frequency data can then be reported to the server, which can provide the information to a user via the user interface and user device.

Figure 5:
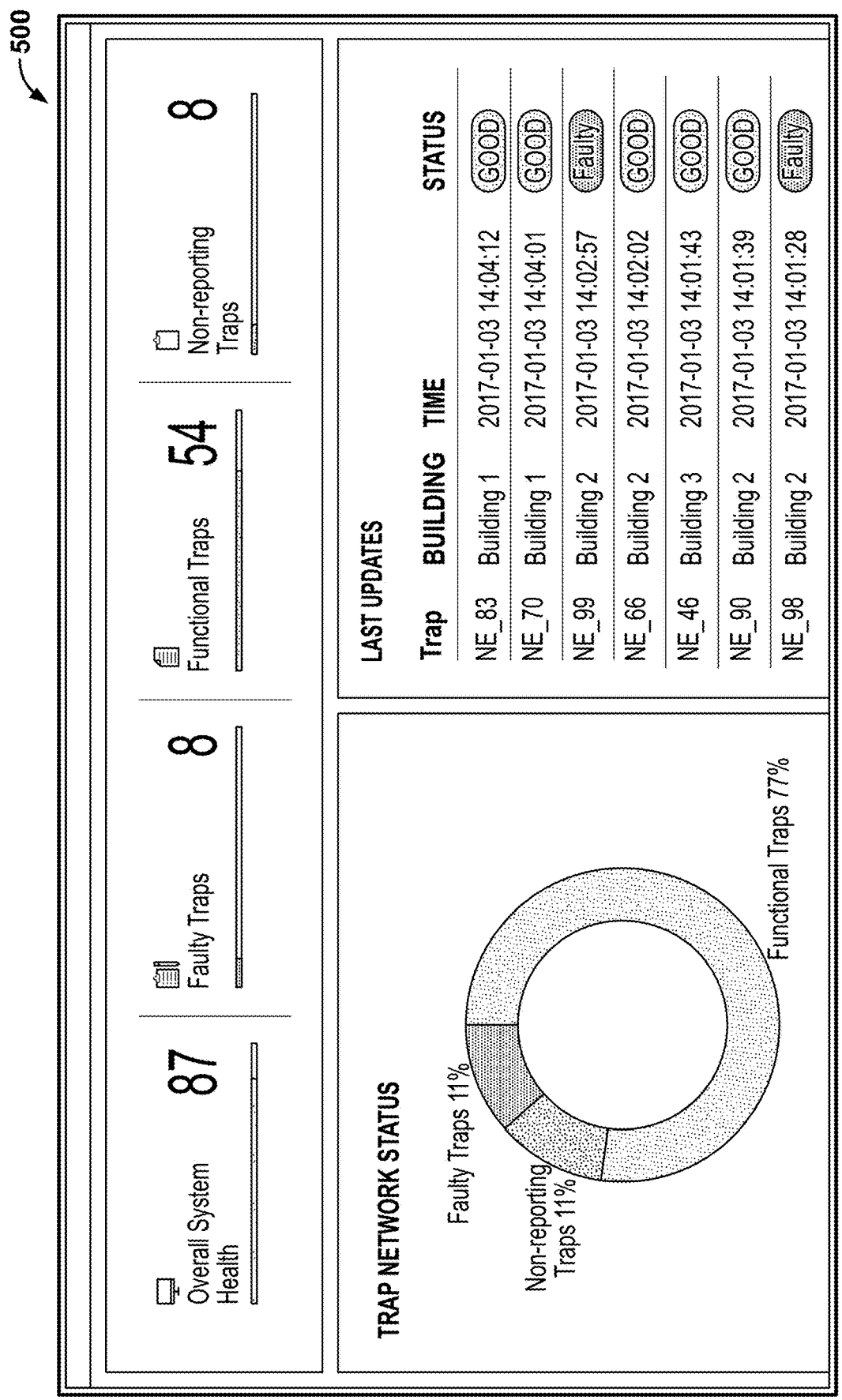
FIG. 5 is an illustration of an example of a user interface showing information on multiple pieces of equipment (steam traps as illustrated) in accordance with some embodiments.

Turning to FIG. 5, an example 500 of a user interface that can be generated by server 106 and presented on user device 108, or generated on and presented by user device 108 using data from server 106, in accordance with some embodiments is illustrated. As shown, this interface provides information for steam traps, though it could be altered to indicate information for any other suitable equipment. User interface 500 can present an overall health score (which can be, for example, the ratio of functional steam traps to total reporting sensor modules), the number of faulty steam traps, the number of functional steam traps, and the number of non-reporting sensor modules. The interface can also present the most-recent sensor module data, such as a steam trap identifier, a building identifier, a date and time, and a status. Any other suitable information can additionally or alternatively be shown.

A steam trap can be determined as being faulty in any suitable manner. For example, in some embodiments, a steam trap can be determined as being faulty when a measured combined frequency intensity measurement (or an average thereof) exceeds a given threshold value for more than a given period of time. In some such embodiments, any suitable threshold and any suitable period of time (include 0 seconds) can be used.

As another example, in some embodiments, to determine whether a steam trap is faulty, the following can be performed. First, during a 30-minute period (or any other suitable duration), the monitor can attempt to read 60 (or any other suitable number) consecutive measurements. The period at which these measurements are made, and the number of measurements, can be variable and set as part of the configuration in some embodiments (which can be set via a configuration downlink). Next, after these 60 measurements are collected, the monitor can measure the variance of the readings. This variance can be calculated using the following equation:

$$f(x) = \sum_{n=1}^{59} (4^{x_n - x_{(n+1)}})$$

where n is an index to the measurements and x is a measurement value. The more the trap cycles the higher the variance is expected to be. A threshold can then be used on the variance to determine whether a trap is operating or whether it is failed. This threshold can variable, can set as part of the configuration, and can be changed during operation via a downlink. If a trap is determined as failed, then an approximation of its failure level is obtained by measuring the acoustic energy in the readings made.

Figure 6:
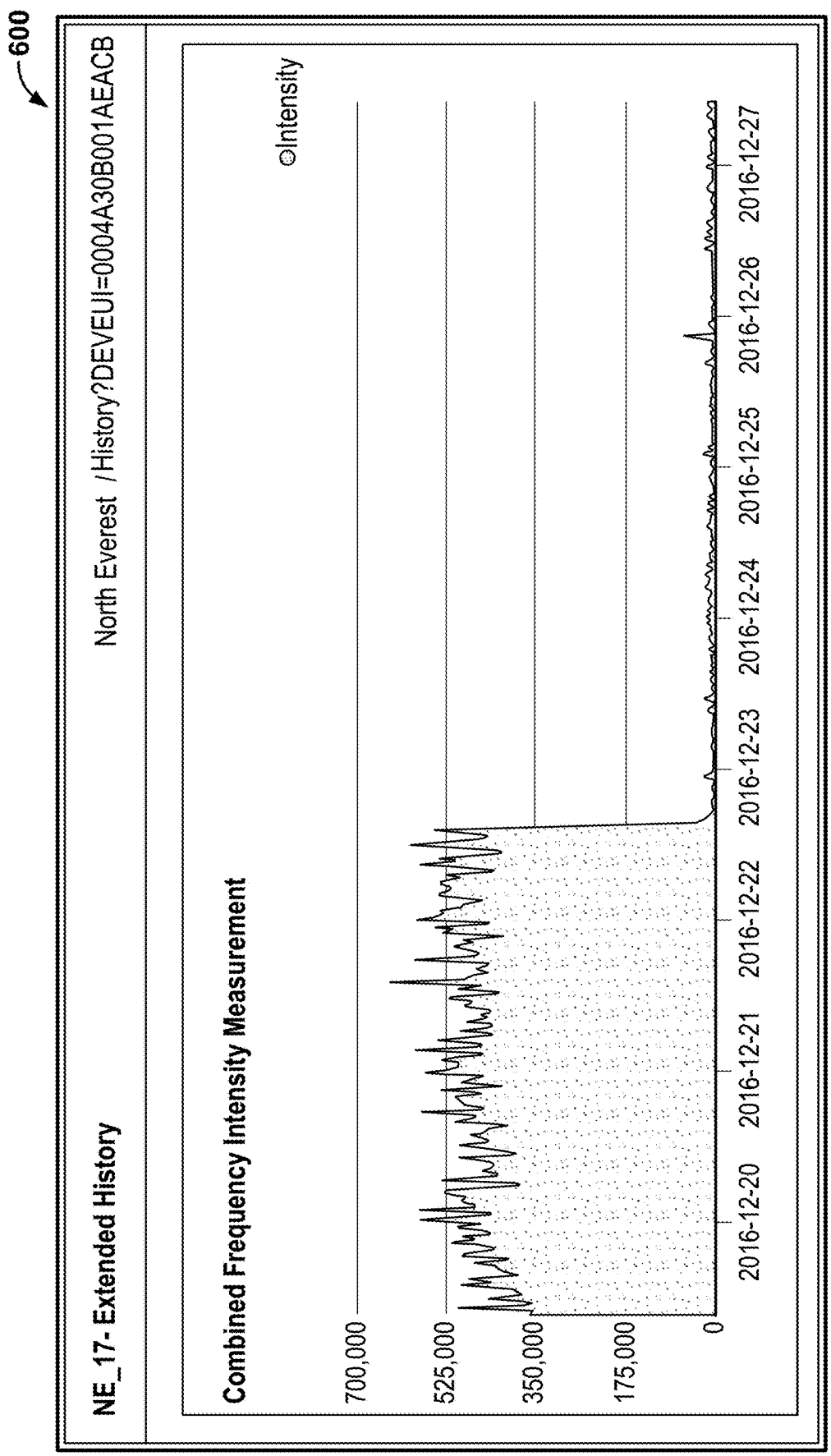
FIG. 6 is an illustration of an example of a user interface showing a combine frequency intensity measurement in accordance with some embodiments.

Turning to FIG. 6, another example 600 of a user interface that can be generated by server 106 and presented on user device 108, or generated on and presented by user device 108 using data from server 106, in accordance with some embodiments is illustrated. As shown, user interface 600 can present combined frequency intensity measurements for a piece of equipment (e.g., a steam trap) over a period of time. Any suitable period of time scale and any suitable intensity scale can be used in some embodiments. As can be seen in the illustrated example, the trap was repaired between 2016 Dec. 22 and 2016 Dec. 23, which resulted in a significant decrease in the combined frequency intensity measurements.

Figure 7:
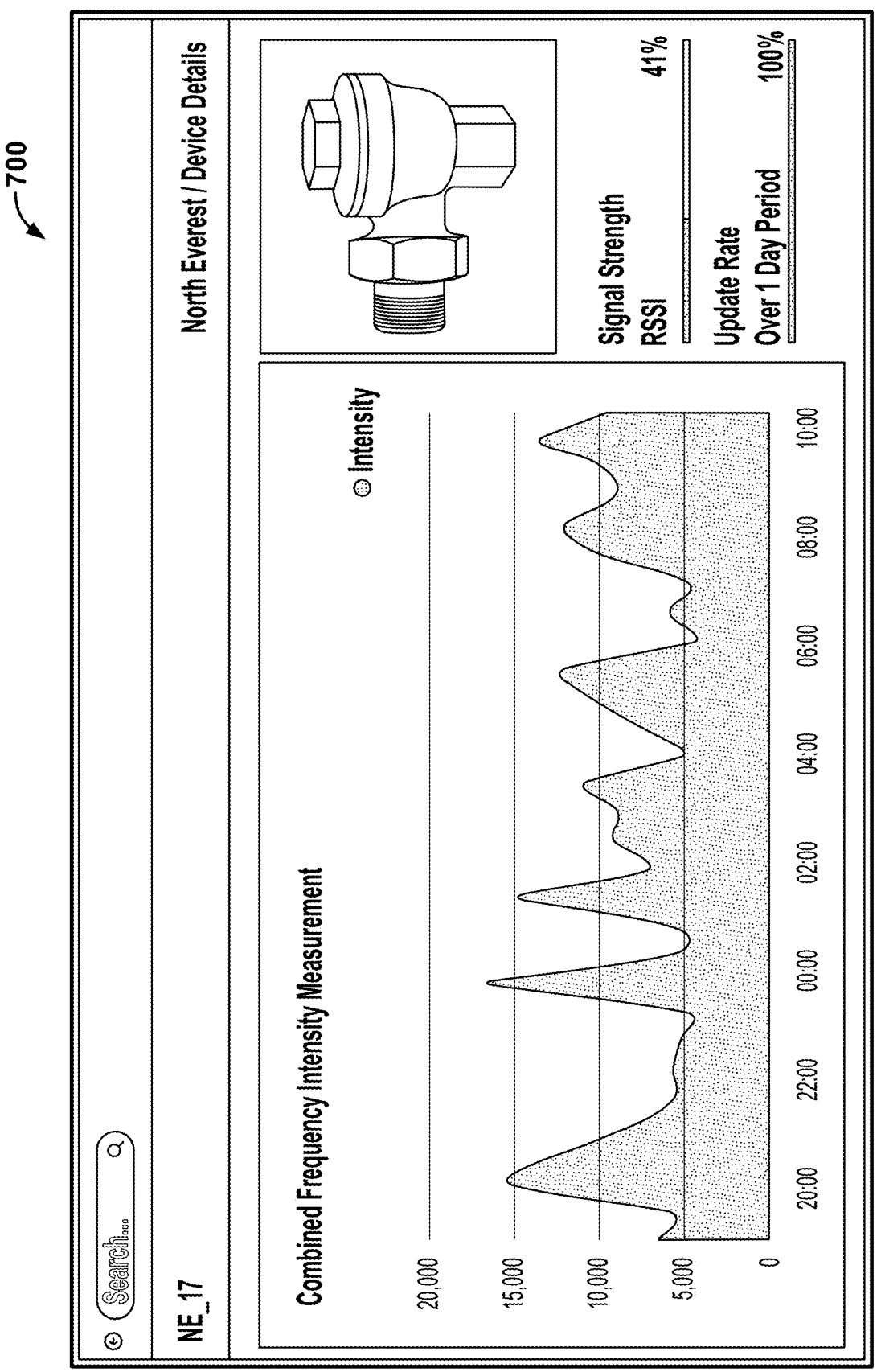
FIG. 7 is an illustration of an example of another user interface showing a combine frequency intensity measurement in accordance with some embodiments.

Turning to FIG. 7, another example 700 of a user interface that can be generated by server 106 and presented on user device 108, or generated on and presented by user device 108 using data from server 106, in accordance with some embodiments is illustrated. As shown, user interface 700, combined frequency intensity measurements for a piece of equipment (e.g., a steam trap) can also be presented on a smaller time scale (i.e., hourly rather than daily as in FIG. 6). As also shown, in some embodiments, a picture of a piece of equipment (e.g., a steam trap) representative of the equipment being monitored can be shown, a signal strength associated with the sensor module's transceiver can be shown, and an update rate for the sensor module can be shown. As further shown, by clicking on the "device details" link, a user can access more information about the equipment, such as location, manufacturer, pressure, pipe size, and/or any other suitable data.

In some embodiments, a user of the user interfaces in FIGS. 5-7 can set one or more thresholds at which alerts may be generated. Any suitable alert mechanism can be used. For example, alerts can be sent as an email, an SMS message, a push notification, an audible alarm, etc. Thresholds can be configured to detect one or more levels of combined frequency intensity measurements and/or intermittent combined frequency intensity measurement levels in some embodiments.

In some implementations, any suitable computer readable media can be used for storing instructions for performing the functions and/or processes described herein. For example, in some implementations, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 3-4 can be executed or performed in any order or sequence not limited to the order and sequence shown and described in the figures. Also, some of the above steps of the processes of FIGS. 3-4 can be executed or performed substantially simultaneously where appropriate or in parallel to reduce latency and processing times.

Figure 9:
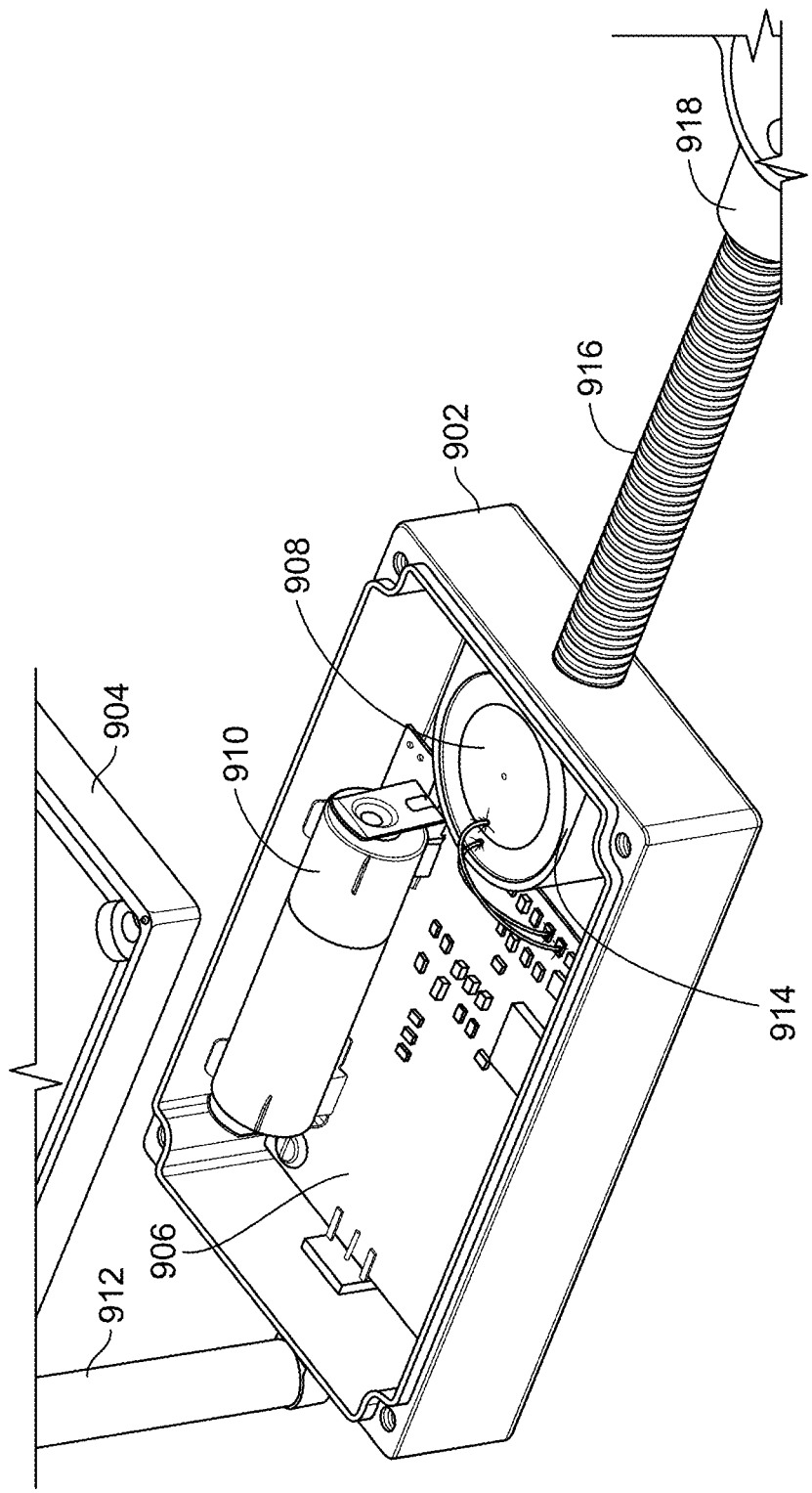
FIG. 9 is an illustration of an example of a layout of components in a sensor module in accordance with some embodiments.
Figure 10A:
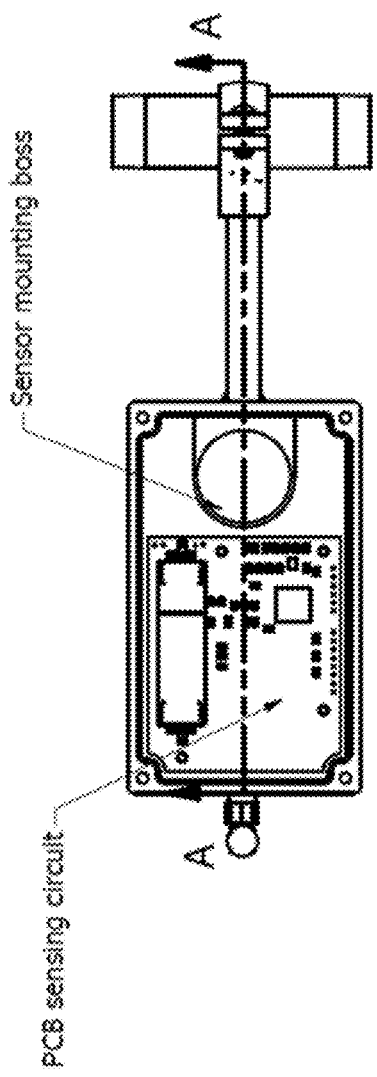
FIGS. 10A and 10B are illustrations of another example of a mechanism for coupling a sensor to a pipe in accordance with some embodiments.
Figure 10B:
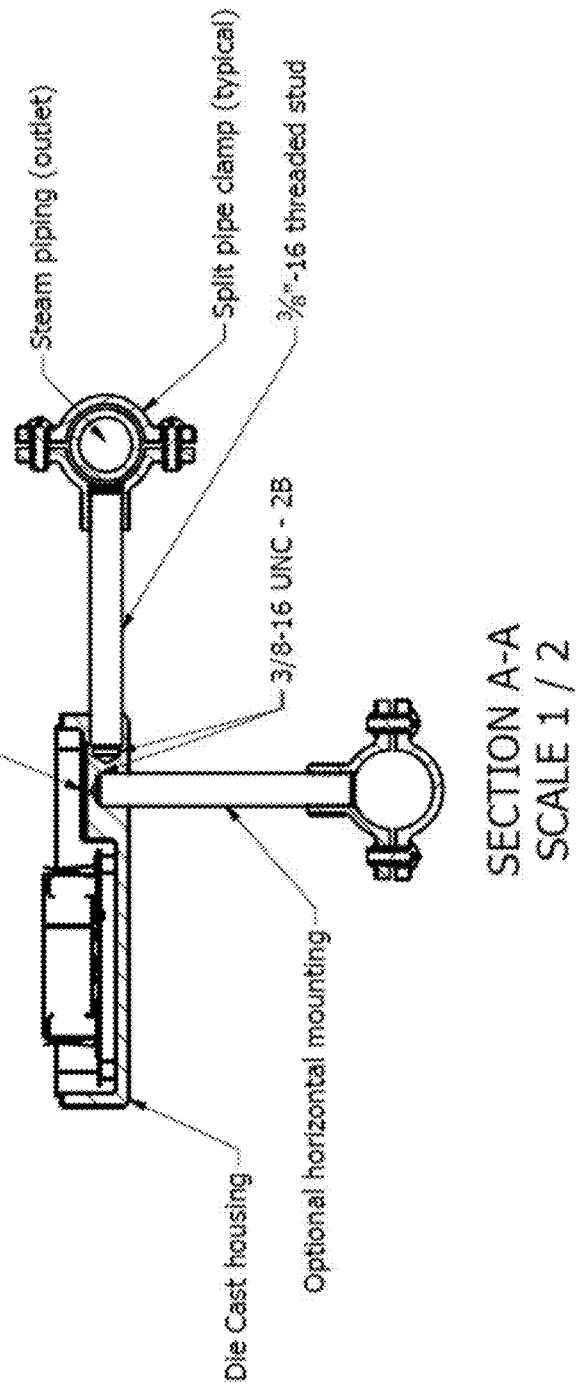
Figure 11:
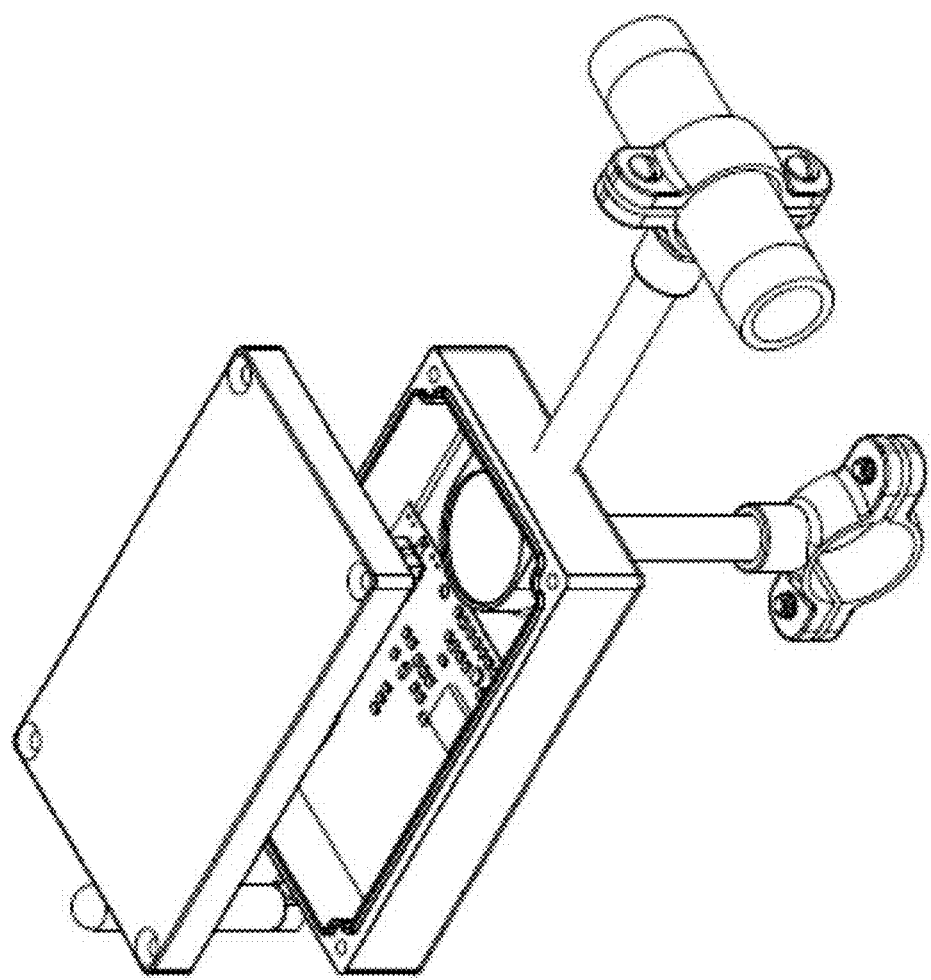
FIG. 11 is an illustration of still another example of a mechanism for coupling a sensor to a pipe in accordance with some embodiments.

Turning to FIGS. 9-11, illustrations of example housings and mounting hardware in accordance with some embodiments are illustrated. As shown in FIG. 9, in some embodiments, a housing can include a housing body 902 and a housing cover 904. The housing body can hold components of a sensor module, such as sensor module 200. These components can include a circuit board 906, a sensor 908, and a battery 910. An antenna 912 can be coupled to the circuit board and positioned outside the housing. The sensor can be mounted to a sensor mounting boss 914 in any suitable manner (e.g., using glue). The sensor mounting boss can be integrated with the housing body. For example, in some embodiments, the sensor body and the sensor mounting boss can be formed from a single piece of diecast aluminum. In some embodiments, any other suitable material can be used and the material can be formed into the sensor body and the sensor mounting boss in any suitable manner. A stud 916 can be screwed into the sensor platform and connected to a pipe clamp 918, which can be connected to a piece of equipment (e.g., a pipe of a steam trap).

FIGS. 10A, 10B, and 11 show alternate views of a housing and the components described in connection with FIG. 9 in accordance with some embodiments. In FIGS. 10B and 11, both a horizontal mounting arrangement (include stud and pipe clamp) and a vertical mounting arrangement (including stud and pipe clamp) are shown. In actual use, only one of these mounting arrangements is required.

In some embodiments, a silicone (or any other suitable material, e.g., rubber) seal can be provided between the housing body and the housing cover to keep moisture away from the components inside the housing. Likewise, the antenna may be coupled to the circuit board in a manner to provides a moisture tight seal.

Figure 12:
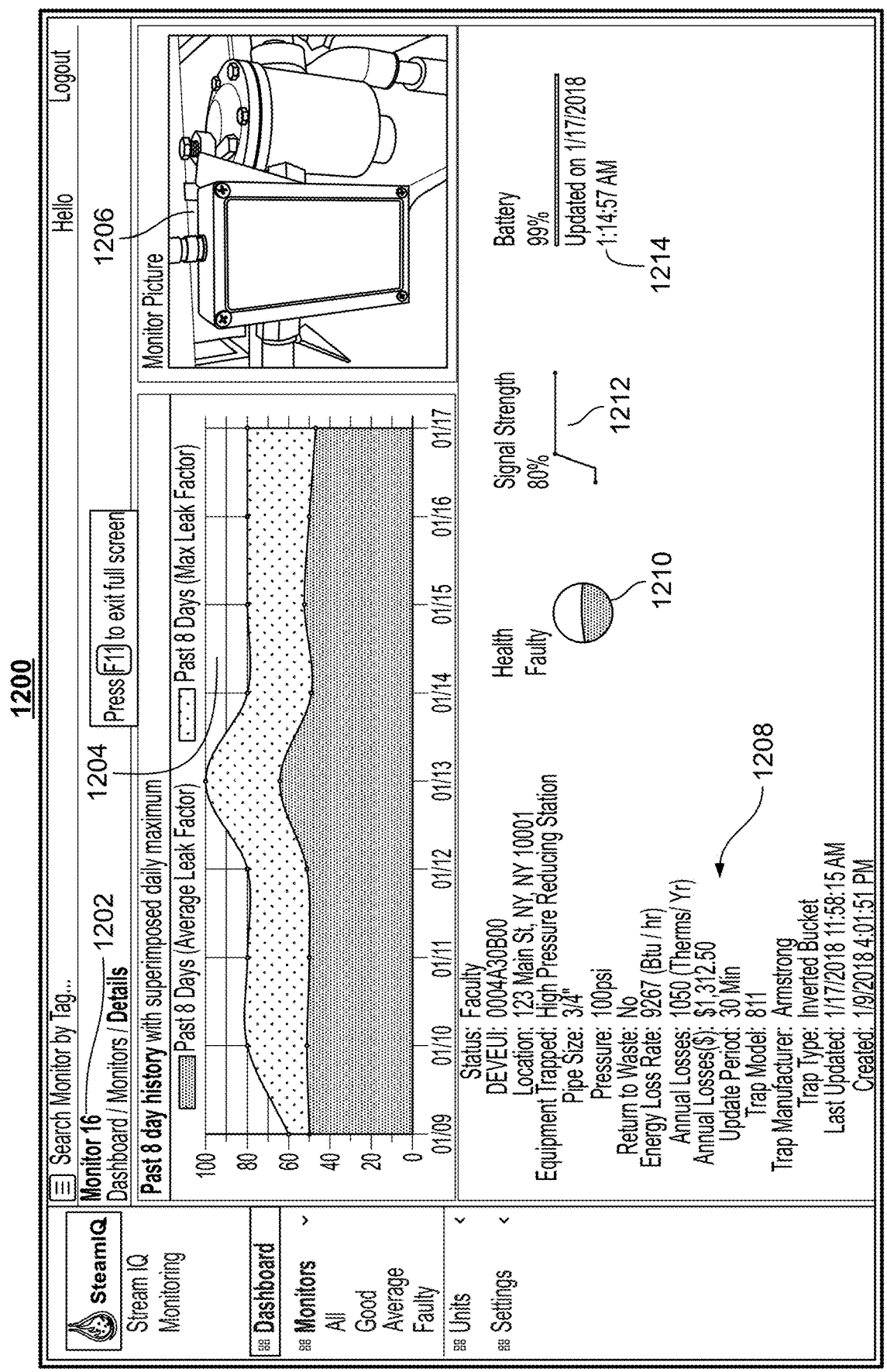
FIG. 12 is an illustration of an example of a user interface showing a graph of sensor measurements in accordance with some embodiments.

FIG. 12 shows an illustration of an example 1200 of a user interface showing a graph of sensor measurements in accordance with some embodiments. As shown, this interface is directed to monitoring steam traps, although this interface can be modified for any other suitable equipment. Interface 1200 shows an identifier (e.g., name) 1202 of a monitor (sensor module) for which information is presented, a graph 1204 showing intensity measurements over eight days (though any other suitable time period can additionally and/or alternatively be used), an image of the monitor 1206, information 1208 for a piece of equipment (e.g., a steam trap) being monitored by the monitor, a health status 1210 of the equipment (which shows the percentage of fault in the equipment), a signal strength 1212 of the monitor, and a battery level 1214 of the monitor. As shown in graph 1204, in an application with a steam trap, the graph can show an average leak factor and a maximum leak factor in some embodiments. In some embodiments, information 1208 can include any suitable information such as an identifier of a monitor, an identifier of a location of the monitor, an identifier of equipment being trapped, an identifier of a size of the pipe to which the monitor is attached, an identifier of a pressure value corresponding the pipe, an identifier of whether the pipe is a return to waste, an estimate of the current energy loss rate (e.g., in BTU/hour), an estimate of the annual loss in Therms (e.g., Therms/year), an estimate of the annual loss in dollars, how often the monitor updates its measurements, an identifier of model of the steam trap being monitored, an identifier of the make of the steam trap being monitored, an identifier of the type of the steam trap being monitored, when the last update was made, and when the record for the monitor was created, and/or any other suitable information.

Figure 13:
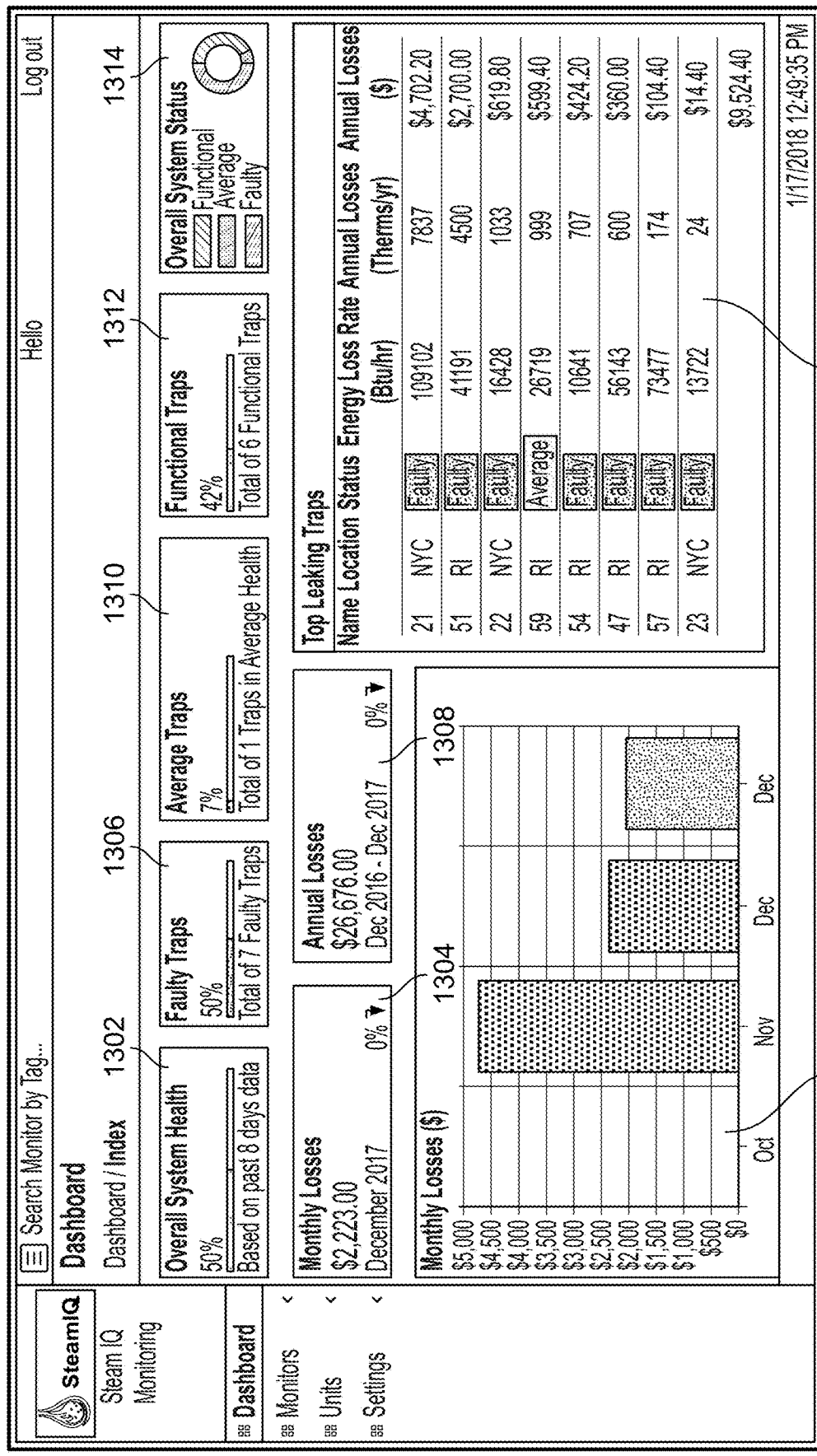
FIG. 13 is an illustration of an example of a user interface showing monetary losses in accordance with some embodiments.

FIG. 13 shows an illustration of an example 1300 of a user interface showing monetary losses in accordance with some embodiments. As shown, this interface is directed to monitoring steam traps, although this interface can be modified for any other suitable equipment. Interface 1300 includes an overall system health indicator 1302 that shows overall health of the steam traps being monitored in a given steam system, an indicator 1304 of the monthly losses in the system, indicators 1306 of the percentage and number of faulty traps in the steam system, an indicator 1308 of the annual losses in the system, indicators 1310 of the percentage and number of traps in the steam system having an average health, indicators 1312 of the percentage and number of traps in the steam system having a functional health, a donut graph 1314 showing the percentage of functional, average, and faulty traps being monitored, a bar graph 1316 showing monthly (or any other suitable time range) of losses, and a table 1318 showing top leaking steam traps indicating, for each trap, a name, a location, a status (average, faulty, etc.), an energy loss rate, annual losses in Therms per year, annual losses in dollars, and/or any other suitable information. Any other and/or alternative suitable information can be presented in interface 1300 in some embodiments.

In some embodiments, losses can be determined in any suitable manner. For example, in some embodiments, losses can be determined by first calculating the discharge steam loss rate (DSLR) using the following equation:

$$DSLR=47.12(\text{Orifice Dia})\bigcirc 2(PSIG+14.7)\bigcirc 0.97,$$

where:
"Orifice Dia" is the diameter of the pipe and "PSIG" is the pressure of the gas in the pipe.

Next, the energy loss rate (ELR) can be calculated using the following equation:

$$ELR=(DSLR)*(\text{Leak Factor})(\text{Pressure of saturated steam–Pressure saturated liquid})(\text{Discharge coefficient})(\text{Closed condensate return factor}),$$

where:
Leak Factor can be one of several values (e.g., 0% for fully plugged, 26% for leaking, and 55% for blowing by, and/or any other suitable values) or can be more precisely calculated based upon the amount of detected acoustic energy. For example, in some embodiments, when the acoustic energy is measured on a scale from 0 (no measured acoustic energy) to 7 (maximum measured acoustic energy), the Leak Factor can be calculated using the following equation:

$$\text{Leak Factor}=0.55*(\text{acoustic energy measurement}/7).$$

Pressure of saturated steam and pressure saturated liquid can be determined from commonly available steam tables.

Discharge coefficient can be 70% or any other suitable value.

Closed condensate return factor can be 36% or any other suitable value.

Then, the Therms lost per year (TLPY) can be calculated using the following equation:

$$TLPY=(\text{Hours of faulty operation})(ELR)/(\text{Boiler Thermal Efficiency \%})(\text{BTU to Therm}),$$

where:
Hours of faulty operation is the amount of time in the year that a faulty steam trap is operating.

Boiler Thermal Efficiency % can be 80% or any other suitable value.

BTU to Therm can be 0.00001 or any other suitable value.

Finally, Annual Losses can be calculated using the following equation:

$$\text{Annual Losses}=(TLPY)(\text{User \$/Therm}),$$

where User $/Therm is the amount of money that a user pays for Therms.

It should also be noted that, as used herein, the term mechanism can encompass hardware, software, firmware, or any suitable combination thereof.

Although the invention has been described in the context of monitoring steam traps, it should be apparent that the mechanisms described herein can be used for other purposes without departing from the spirit and scope of the invention. For example, in some embodiments, the mechanisms can be used to detect leaking gas in a gas system (such as a natural gas system, an ammonia gas system, a nitrogen gas system, a hydrogen gas system, and/or any other suitable gas system). As another example, in some embodiments, the mechanisms can be used to determine that a bearing or other mechanical device that is subject to wear failure is failing. As yet another example, in some embodiments, the mechanisms can be used to determine that a valve (such as a water valve or air valve) is failing.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims. Features of the disclosed implementations can be combined and rearranged in various ways.

What is claimed is:

1. A device for monitoring a piece of equipment, comprising:
a hardware processor configured to:
receive intensity signals based on the signal output of a sensor;
perform a fast Fourier transform on the received intensity signals to produce a set of output band values for each of a plurality of frequency bands;
filter-out first output band values of the set of output band values corresponding to frequency bands less than 19 kHz;
average at least some of the output band values to produce an average value; and
calculate a sum of at least some of the output band values.

2. The device of claim 1, further comprising:
an amplifier having an input coupled to the signal output of the sensor and having an output.

3. The device of claim 2, further comprising:
an analog-to-digital converter (ADC) having an input coupled to the output of the amplifier and having an output that produces the intensity signals.

4. The device of claim 3, wherein the ADC and the hardware processor are integrated into a single component.

5. The device of claim 1, wherein the hardware processor is configured to also filter-out second output band values of the set of output band values corresponding to frequencies bands above 51 kHz before averaging the at least some of the output band values to produce the average value.

6. The device of claim 1, wherein the hardware processor is configured to exclude output band values less than twice the average value from the sum of at least some of the output band values.

7. The device of claim 1, further comprising a device body that houses the sensor, a hardware processor, and the transceiver.

8. The device of claim 1, wherein a portion of the device body forms at least a part of the mechanical structure that acoustically couples the sensor to the piece of equipment.

9. The device of claim 1, wherein the hardware processor is further configured to receive configuration settings from the remote device.

10. A method for monitoring a piece of equipment, comprising:
receiving intensity signals based on the signal output of a sensor;
performing a fast Fourier transform on the received intensity signals to produce a set of output band values for each of a plurality of frequency bands using a hardware processor;
filtering-out first output band values of the set of output band values corresponding to frequency bands less than 19 kHz;
averaging at least some of the output band values to produce an average value; and
calculating a sum of at least some of the output band values.

11. The method of claim 10, further comprising filtering-out second output band values of the set of output band values corresponding to frequencies bands above 51 kHz before averaging the at least some of the output band values to produce the average value.

12. The method of claim 10, further comprising excluding output band values less than twice the average value from the sum of at least some of the output band values.

13. The method of claim 10, further comprising receiving configuration settings from the remote device.

14. A non-transitory computer readable medium containing computer executable instructions that, when executed by a processor, cause the processor to perform a method for monitoring a piece of equipment, the method comprising:
receiving intensity signals based on the signal output of a sensor;
performing a fast Fourier transform on the received intensity signals to produce a set of output band values for each of a plurality of frequency bands;
filtering-out first output band values of the set of output band values corresponding to frequency bands less than 19 kHz;
averaging at least some of the output band values to produce an average value; and
calculating a sum of at least some of the output band values.

15. The non-transitory computer readable medium of claim 14, wherein the method further comprises filtering-out second output band values of the set of output band values corresponding to frequencies bands above 51 kHz before averaging the at least some of the output band values to produce the average value.

16. The non-transitory computer readable medium of claim 14, wherein the method further comprises excluding output band values less than twice the average value from the sum of at least some of the output band values.

17. The non-transitory computer readable medium of claim 14, wherein the method further comprises receiving configuration settings from the remote device.

\* \* \* \* \*